UNITED STATES PATENT OFFICE.

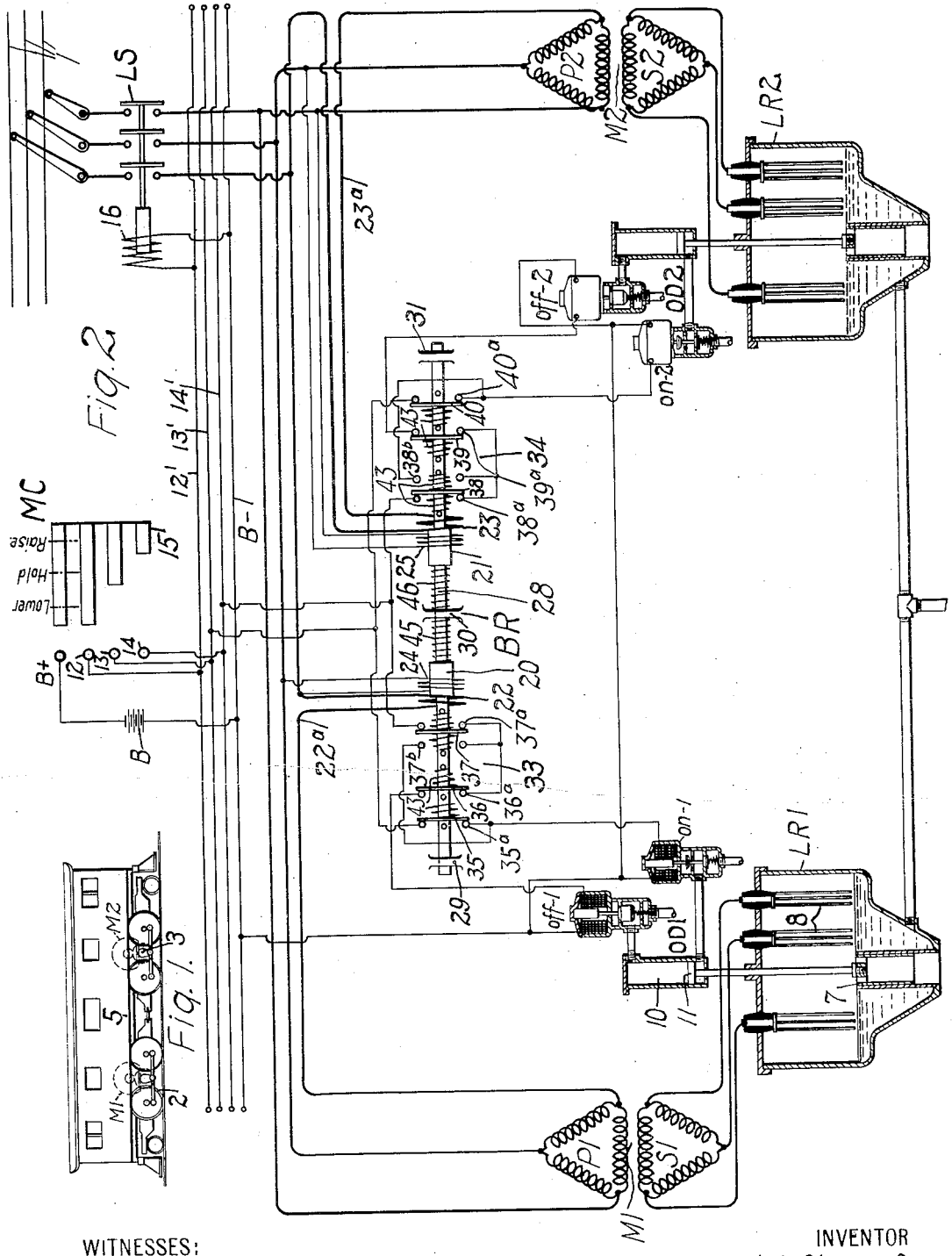

KARL A. SIMMON, OF EDGEWOOD PARK, AND ARTHUR J. HALL, OF WILKINSBURG, PENNSYLVANIA, ASSIGNORS TO WESTINGHOUSE ELECTRIC AND MANUFACTURING COMPANY, A CORPORATION OF PENNSYLVANIA.

CONTROL SYSTEM.

1,236,780.  Specification of Letters Patent.  Patented Aug. 14, 1917.

Application filed July 24, 1914. Serial No. 852,826.

*To all whom it may concern:*

Be it known that we, KARL A. SIMMON, a citizen of the United States, and a resident of Edgewood Park, in the county of Allegheny and State of Pennsylvania, and ARTHUR J. HALL, a subject of the King of Great Britain, and a resident of Wilkinsburg, in the county of Allegheny and State of Pennsylvania, have invented a new and useful Improvement in Control Systems, of which the following is a specification.

Our invention relates to control systems for dynamo-electric machines that are employed for propelling electric locomotives or other electric vehicles, and it has special reference to the regulation of polyphase induction motors that are utilized for driving a common load.

One of the objects of our invention is to provide a system for controlling the driving units or motors of an electric locomotive or train of electric vehicles in such manner that a predetermined division of the load between the driving units shall be maintained at all times, irrespective of variations in mechanical construction and electrical characteristics of the motors, the construction and operation of the governing devices, or differences in the diameters of driving wheels.

In another aspect, it is the object of our invention to provide automatic means for proportioning the total load between a plurality of motor driven units which may constitute a plurality of separate motor-driven axles, motor-driven trucks or locomotive half units.

More specifically, it is the object of our invention to provide a control system having simple connections for automatically regulating the distribution of load between several polyphase induction driving motors that are governed by electro-pneumatically operated liquid rheostats by means of a three-position differential or balancing relay which is responsive to relative load conditions upon the driving motors and which coöperates with the operating mechanisms in such manner as to decrease the load of the overloaded motor or motors, and concurrently increase the load carried by the remaining motor or motors under conditions of unbalanced loads.

For the sake of simplicity, we shall set forth our invention as embodying a control system of the multiple unit type for governing the operation of a pair of polyphase induction motors through the agency of separate electrically controlled liquid rheostats, the several motors being mounted upon the respective driving trucks of a single locomotive, although it is evident that each truck may be provided with a pair of driving motors, the loads of which may be balanced, or that two half units of a locomotive may be similarly regulated.

In the accompanying drawing, Figure 1 is a view in side elevation of a locomotive having driving motors that may be conveniently controlled by a system embodying our invention; and Fig. 2 is a diagrammatic view of our control system as applied to the motors of the locomotive shown in Fig. 1.

Referring to the drawing, a plurality of supply circuit conductors 1 are adapted to deliver polyphase alternating current energy to primary windings P1 and P2 of a pair of driving motors M1 and M2 that are connected in multiple relation and which embody secondary windings S1 and S2 that are respectively connected to liquid rheostats LR1 and LR2. The motors M1 and M2 are mounted upon driving trucks 2 and 3 that are associated with and carry a locomotive cab or body 5 in a well known manner.

The several rheostats LR1 and LR2 are of like construction and each embodies a regulating valve 7 that is adapted to be raised and lowered in position to determine the height of the electrolyte in which a plurality of electrodes 8 are adapted to be immersed.

The several regulating valves 7 of the respective rheostats LR1 and LR2 are adapted to be actuated by means of electrically controlled pneumatic operating devices OD1 and OD2, respectively, each of said devices comprising a cylinder 10, a movable piston 11, an electrically controlled valve "off—1," (the numeral designating the rheostat with which the valve is associated) that is located at the upper end of the cylinder 10 and is normally open to admit a suitable operating fluid, and another electrically operated valve "on—1" that is arranged to control the admission of operating fluid to the lower end of the cylinder 10 and which is normally closed to the supply of operating fluid and opened to the atmosphere.

The structural details of the several liquid rheostats and the operating devices are old in the art and their mode of operation is well known, inasmuch as devices of this type are fully set forth in our co-pending application, Serial No. 846,289, filed June 20, 1914. It will be understood that when both valves are deënergized, unbalanced pressures act upon the pistons 11 to effect downward movements thereof, when both valves are energized, unbalanced pressures serve to move the pistons in an upward direction, and when only the "on—1" magnet valves are energized, the pistons are held stationary.

The normal manually controlled operation of the system is governed by means of a master controller MC which comprises a plurality of stationary contact terminals B+, 12, 13, and 14 which are adapted to coöperatively engage a movable conducting segment 15 upon the position-indicating lines marked "Lower," "Hold" and "Raise." The several contact terminals 12, 13 and 14 are respectively connected to a plurality of train line conductors 12', 13' and 14', while the positive side of an auxiliary battery B is connected to terminal B+ and its negative side to a train line conductor B—.

The several train line conductors 12', 13', 14' and B— are so connected to the several "off" and "on" magnet valves of the operating devices OD1 and OD2 that, under normal operating conditions, said devices actuate the respective regulating valves 7 of the rheostats LR1 and LR2 in an upward direction when the master controller MC occupies its "raise" position, said regulating valves are held stationary when the master controller MC is in its "hold" position, and said valves are moved downwardly by their respective operating devices when contact terminals B+ and 12 only engage the conducting segment 15 in the "lower" position of the master controller. The line switch LS is held closed by its closing magnet 16 whenever the master controller MC is in any of its operative positions. For a further exposition of the control apparatus and the functions thereof, reference may be had to the co-pending application to which attention has been directed.

In order to provide for a predetermined division of the load between the several driving motors M1 and M2, an auxiliary differential or balancing relay BR is provided, which comprises a plurality of mechanically associated magnetizable cores 20 and 21 that are respectively provided with series current coils 22 and 23 and voltage coils 24 and 25. The series current coils 22 and 23 are, respectively, connected in series circuit with motor lead conductors 22$^a$ and 23$^a$ associated with the several motors M1 and M2, while the voltage coils 24 and 25 are connected to be influenced by the voltages of the respective motors. The strengths of the opposing electro-magnets or relays are, therefore, dependent upon the loads upon the motors M1 and M2. Under normal operating conditions, when the driving motors M1 and M2 are carrying their proper shares of the total load, the coöperating balancing relays just neutralize each other and no resultant movement thereof is effected. However, if either of the driving motors carries more that its intended share of the load, one of the relays overcomes the other and a movement thereof in one direction or the other results.

The several cores 20 and 21 are rigidly associated with a supporting rod 28 that has sliding bearings in a plurality of bearing members 29, 30 and 31, and the respective ends of the rod 28 are provided with a plurality of sets 33 and 34 of spring-supported movable switch members 35, 36 and 37, and 38, 39 and 40, the several switch members being normally adapted to make coöperative engagement with stationary contact terminals 35$^a$, 36$^a$, 37$^a$, 38$^a$, 39$^a$, and 40$^a$. Moreover, switch members 37 and 38 are provided with another set of stationary contact terminals 37$^b$ and 38$^b$ with which engagement is effected when the associated relays are actuated in a predetermined direction. The switch members 35, 36, 39 and 40 are resiliently supported by coil springs 43, one end of each of which is pinned or otherwise secured to the rod 28 and the other end thereof engages the switch member. The switch members 37 and 38 are resiliently positioned by a plurality of springs 43 between which said switch members are disposed.

The set 33 of auxiliary switches is adapted to control the energizing circuits of the magnet valves "off—1" and "on—1" of rheostat LR1, while the set 34 of auxiliary switches similarly governs the circuit connections of the magnet valves "off—2" and "on—2" of rheostat LR2. The balancing relay BR is adapted to occupy three positions, it being normally maintained in its neutral or middle position, as shown in Fig. 1, by means of centralizing springs 45 and 46 which are respectively disposed around the rod 28 and between the bearing member 30 and the cores 20 and 21.

Assuming the arrangement of apparatus and circuit connections to be as shown, the operation thereof is as follows: The master controller MC is first moved into its "raise" position, thereby completing a circuit from terminal B+ which includes conducting segment 15, terminal 14, and train line conductor 14', where the circuit divides, one branch including coöperating contact members 37 and 37$^a$, coöperating contact members 36 and 36$^a$, and energizing coil of magnet valve "off—1" to the B— train line conductor, while the other branch includes coöperating contact members 38 and 38$^a$, coöperating contact members 39 and 39ª and energizing coil of magnet valve "off—2" to the conductor B—. Concurrently, another circuit is established from contact terminals B+ which includes contact segment 15, contact terminal 13, and train line conductor 13' where the circuit divides, one branch traversing coöperating contact members 35 and 35ª and energizing coil of magnet valve "on—1" to the B— conductor, and the other branch traversing coöperating contact members 40 and 40ª, energizing coil of magnet valve "on—2" and thence to the train line conductor B—. At the same time that these circuits are completed another circuit is also established from contact terminal B+ through conducting segment 15, contact terminal 12, train line conductor 12', and energizing coil of closing magnet 16 of the line switch LS to the B— train line conductor.

Having established the circuits just traced, the line switch LS is closed to connect the multiple related motors M1 and M2 to the supply circuit conductors 1, while all of the "off" and "on" magnet valves are energized and correspondingly actuated, the "on" magnet valves being opened to admit operating fluid below the pistons 11 and the "off" magnet valves being closed to the supply of operating fluid and open the upper ends of the cylinders 10 to the atmosphere. Thus, operating fluid is released from the upper ends of the cylinders 10, whereby unbalanced pressure conditions are effected which result in upward movements of the several pistons 11 and their associated regulating valves 7. When the regulating valves 7 are gradually raised in position, the continuously inflowing electrolyte within the rheostats LR1 and LR2 is correspondingly raised in level, and, consequently, resistance is gradually excluded from the motor secondary circuits, thereby causing the motors M1 and M2 to be accelerated.

Thus, concurrent operation of the several operating devices OD1 and OD2 is effected, provided the load is properly divided between the several driving motors M1 and M2. For purposes of explanation, however, it will be assumed that for some reason, possibly because of differences in wheel diameters, motor M1 has a tendency to carry more than its intended share of the load. The coils 22 and 24 of the balancing relay BR, therefore, produce a magnetic pull in excess of that resulting from the action of the coils 23 and 25 of the opposite relay and, therefore, the cores 20 and 21 and their associated supporting rod 28 are actuated to the left. In so doing, engagement between switch members 35, 36 and 38 and their coöperating terminals 35ª, 36ª and 38ª is maintained, while switch members 37, 39 and 40 are caused to disengage their coöperating terminals 37ª, 39ª and 40ª, the switch member 37 being brought into engagement with its other set of terminals 37ᵇ. As the switch member 37 disengages its terminals 37ª, the main energizing circuit from contact terminal 14 of the master controller MC is interrupted. However, an energizing circuit is immediately reëstablished from terminal 13 by the engagement of switch member 37 with coöperating terminals 37ᵇ, so that the magnet valves "off—1" and "on—1" continue to be energized as before. Therefore, the operation of rheostats LR1 and its associated motor M1 continues without interruption. However, the disengagement of switch members 39 and 40 from their coöperating terminals 39ª and 40ª serves to interrupt the energizing circuits of magnet valves "off—2" and "on—2", and said magnet valves are deënergized and are returned to their initial positions to admit operating fluid above the piston 11 of device OD2 and to release it from beneath said piston, whereby said piston and its associated regulating valve 7 is moved downwardly to lower the level of the electrolyte within rheostat LR2 and to correspondingly decrease the speed of motor M2. It is, therefore, manifest that motor M1 continues to increase its speed and load, while motor M2 concurrently reduces the load which it carries until an equalization of loads between the several motors is effected, or at least, until the desired division of load obtains.

Without further description, those skilled in the art will understand that similar changes in circuit connections and in the operation of the apparatus are effected if the load upon motor M2 exceeds that carried by motor M1.

In certain instances, it may be desirable to make the automatic operation of the balancing relay dependent upon the relative motor currents alone, which may readily be accomplished by omitting the voltage coils of the opposing relays. Moreover, by simple rearrangements of the control circuits with respect to the balancing relay, provision may be made for merely interrupting the circuit of the "off" magnet valves associated with the rheostat which controls the motor having the greatest load, whereby its load is held substantially constant until the other driving motor increases sufficiently in speed to effect the desired proportioning thereof.

Obviously, these and other modifications in circuit connections as well as in the structural details of the apparatus may be effected without departing from the spirit and scope of our invention, and we desire that only such limitations shall be imposed as are indicated in the appended claims.

We claim as our invention:

1. In a control system, the combination with a plurality of electric driving units working upon a common load, of electro-responsive means for dividing the load between said units and embodying opposing electromagnets and a plurality of sets of switches associated therewith for severally modifying the operation of said units.

2. In a control system, the combination with a plurality of electric motors working upon a common load, and means for individually controlling the operation thereof, of a differential relay having coils respectively associated with said motors, and a plurality of sets of switches operatively associated therewith and severally adapted to affect the operation of said controlling means.

3. In a control system, the combination with a plurality of electric motors working upon a common load, and means for individually controlling the operation thereof, of a differential relay having coils respectively associated with said motors and a plurality of sets of switches operatively associated therewith for modifying the operation of one or the other of said controlling means in accordance with the action of said differential relay.

4. In a control system, the combination with a plurality of electric motors working upon a common load, and means for individually controlling the operation thereof, of opposing electromagnets severally influenced by circuit conditions of the respective motors, and switches operated thereby for modifying the operation of said controlling means in accordance with predetermined conditions.

5. In a control system, the combination with a plurality of motors working upon a common load, and a plurality of electrically controlled devices for separately governing said motors, of a differential relay having a plurality of coils respectively influenced by load conditions of the several motors and a plurality of sets of switches operated thereby and respectively adapted to govern the operation of said electrically controlled motor-governing devices, each set of switches being adapted to modify the action of its associated governing devices when actuated in one direction and to maintain normal operation thereof when actuated in the opposite direction.

6. In a control system, the combination with a plurality of motors working upon a common load, and a plurality of electrically controlled devices for separately governing said motors, of a differential relay having a plurality of coils respectively influenced by the loads upon the several motors and normally biased to a neutral position, and a plurality of switches associated therewith and adapted to coöperatively engage their respective terminals when said relay occupies its neutral position, part of said switches being adapted to disengage their terminals when actuated in one direction and to maintain engagement therewith when actuated in the other direction.

7. A differential relay adapted to occupy three positions and comprising a pair of associated opposing electromagnets, a plurality of sets of stationary contact terminals and a plurality of movable contact members adapted to coöperatively engage a portion of said sets of terminals under normal conditions, and to maintain engagement with certain of said sets of terminals and to effect disengagement of other of said sets of terminals when actuated in one direction and vice-versa.

8. A differential relay adapted to occupy three positions and biased to its middle position and embodying a plurality of spring supported movable contact members and coöperating stationary contact terminals, a portion of said contact members and terminals being adapted for coöperative engagement in the neutral and in one other position thereof, and another portion of said members and terminals being adapted for coöperative engagement in the neutral and in the remaining position thereof.

9. In a control system the combination with a plurality of motors working upon a common load, and a plurality of electrically controlled devices for separately governing the operation thereof, of a pair of associated opposing relays severally responsive to load conditions of said motors and adapted to occupy three operating positions, being normally biased to a middle position, and a plurality of sets of switches for severally controlling the action of said governing devices and adapted to be actuated by said relays in accordance with the relative load conditions of said motors.

10. In a control system the combination with a plurality of motors working upon a common load, and a plurality of electrically controlled devices for separately governing the operation thereof, of a three-position differential relay having a plurality of coils responsive to the load conditions of the respective motors and normally biased to its middle position, and a plurality of sets of switches associated therewith and actuated thereby for severally controlling the operation of said governing devices in accordance with relative load conditions upon said motors.

11. In a control system, the combination with a plurality of electric driving units working upon a common load, of electro-responsive means embodying a plurality of sets of current and potential coils, said sets of coils being respectively dependent upon the power load conditions of the respective driving units, and switching means operated by said electro-responsive means, whereby the operation of said driving units is governed.

12. In a control system, the combination with a plurality of electric driving units working upon a common load, of a differential relay having a current coil and a potential coil responsive to circuit conditions of one of said driving units, and a current coil and a potential coil responsive to circuit conditions of the other of said driving units, and switching apparatus associated with said relay, whereby the operation of said driving units is governed and the relative loads thereof are proportioned accordingly.

In testimony whereof, we have hereunto subscribed our names this 6th day of July, 1914.

KARL A. SIMMON.
ARTHUR J. HALL.

Witnesses:
    D. H. MACE,
    B. B. HINES.